UNITED STATES PATENT OFFICE.

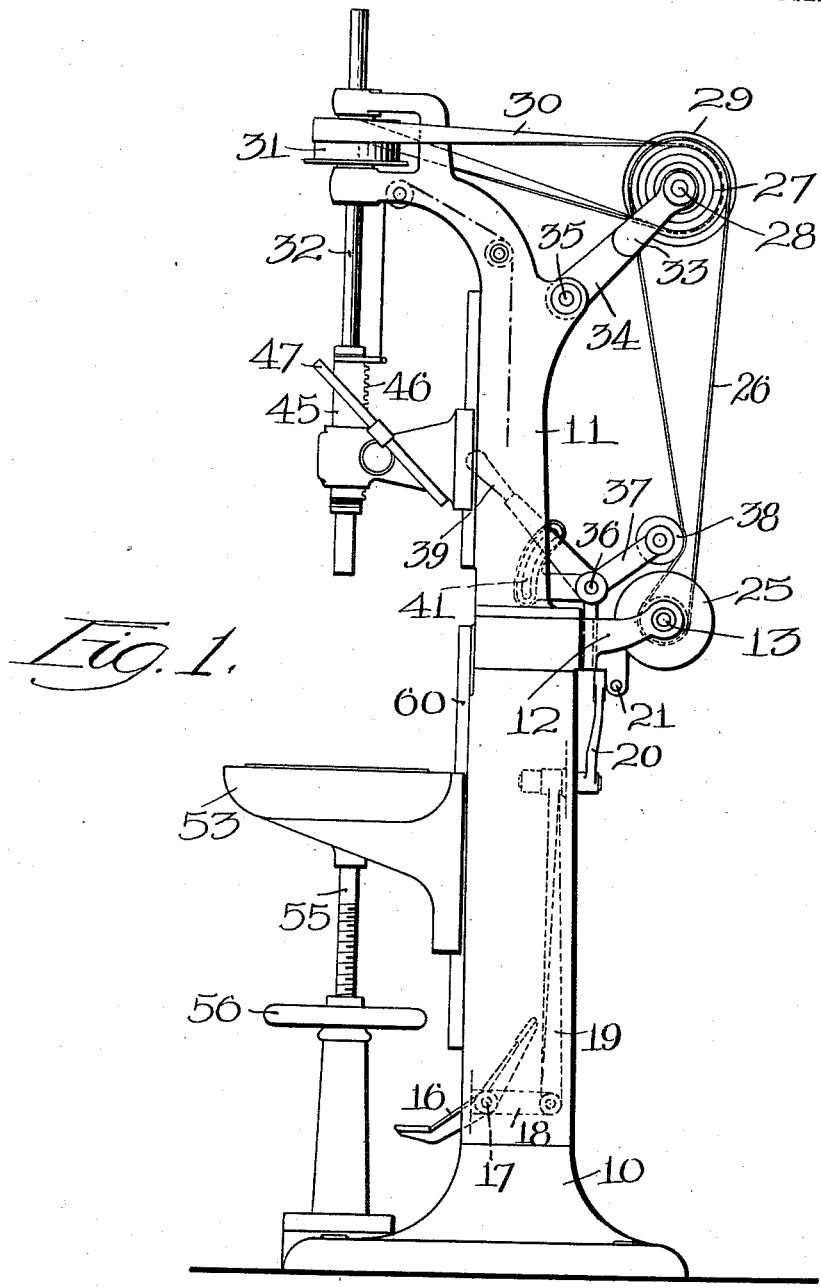

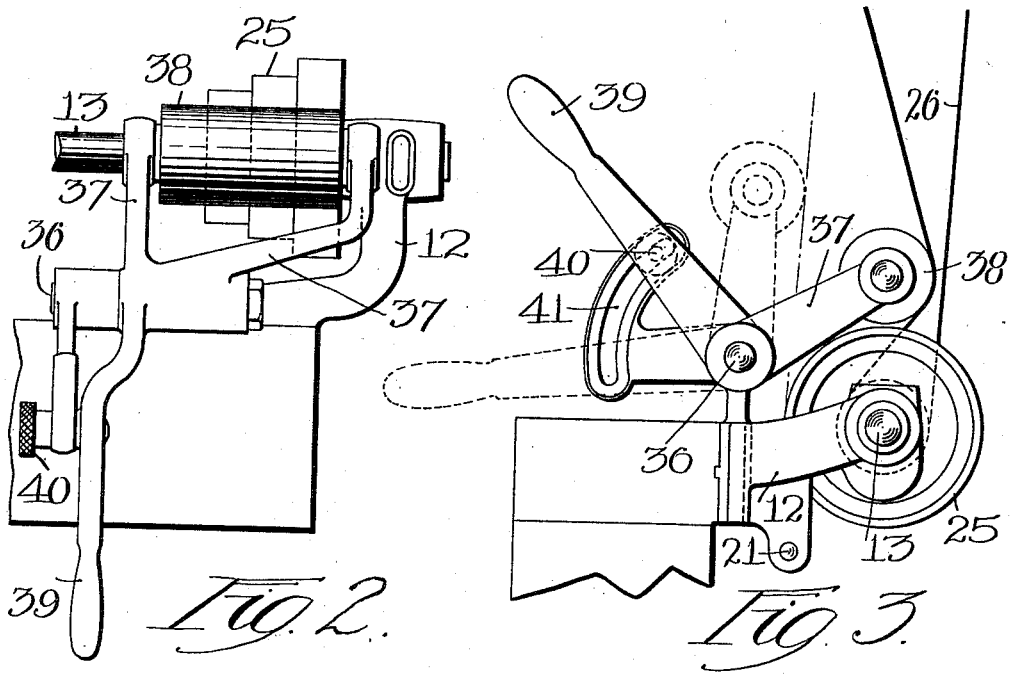

ALBERT E. NEWTON, OF WORCESTER, MASSACHUSETTS, ASSIGNOR TO PRENTICE BROS. COMPANY, A CORPORATION OF MASSACHUSETTS.

BELT-DRIVE.

1,019,516.  Specification of Letters Patent.  Patented Mar. 5, 1912.

Application filed October 20, 1910. Serial No. 588,206.

*To all whom it may concern:*

Be it known that I, ALBERT E. NEWTON, a citizen of the United States, residing at Worcester, in the county of Worcester and State of Massachusetts, have invented a new and useful Belt-Drive, of which the following is a specification.

The principal objects are to provide an exceedingly simple and inexpensive construction whereby the spindle of a sensitive drill can be driven from a driving pulley by two belts passing over intermediate pulleys on a shaft journaled on a swinging arm, in such a way that the tensions of the two belts will be automatically equalized at all times and the belt tension of both belts can be adjusted instantly at any time and to any necessary degree by simply operating a lever or the like, without interfering with the relative tensions of the two belts; and to provide an improved form of belt shifter.

Further objects and advantages of the invention will appear hereinafter.

Reference is to be had to the accompanying drawings, in which—

Figure 1 is a side elevation of a sensitive drill constructed in accordance with this invention. Fig. 2 is a plan of the belt tensioning device on enlarged scale, and Fig. 3 is a side view of the same.

In the form of the invention shown in the drawings, a sensitive drill is illustrated having a standard or frame 10 supporting a goose-neck 11. Extending along the frame supported by bracket 12 thereon at the bottom of the goose neck is a driving shaft 13 having tight and loose pulleys 14 and 15 respectively for receiving power. For the purpose of shifting the belt on these tight and loose pulleys a pivoted treadle 16 is shown mounted on a shaft 17 near the floor. On the shaft is an arm 18 connected by a link 19 with a bell-crank 20 which is connected with a horizontal slide 21 on which the belt shifter 22 is located. With this construction it will be seen that the treadle can be operated to shift the belt and that this can be accomplished by the foot of the operator without diverting his attention from other operations which he may be performing with his hands. This constitutes a very simple and effective belt shifter and one which results in the saving of considerable time in the course of the day.

On the shaft 13 is a cone pulley 25. This pulley is connected by a belt 26 with a cone pulley 27 on a shaft 28 on which shaft is also fixed a pulley 29 connected by a belt 30 with a pulley 31 on the drill spindle 32. The shaft 28 is mounted in bearings on a fork 33 forming part of an arm 34 and pivoted at 35 to the back of the goose-neck. This arm is pivoted in such position that it extends between the two belts and in normal position will substantially bisect the angle between them. The arm is freely pivoted so that it is always free to move in either direction. Consequently if for any reason one of the belts is tighter than the other, it will pull the arm over in that direction until the tensions of the two belts are automatically equalized. For this reason the two belts can be tightened, or their tension otherwise regulated, by a single belt tightener independent of said arm. In the present case this fact is taken advantage of by placing a shaft 36 on the frame and providing it with an arm or arms 37 which carry a belt tightening pulley 38 adapted to engage the belt 26. This shaft is provided with an operating handle or lever 39 and with a pin 40 in a slot 41 on the frame to limit the motion of the lever. It will be seen that the tightening of the belt 26 in this way will also result in equal tightening of the belt 30.

The drill spindle is provided with the usual quill 45, rack 46 feed-lever 47, etc.

While I have illustrated and described a preferred embodiment of the invention, I am aware that many modifications can be made therein by any person skilled in the art without departing from the scope of the invention as expressed in the claims. Therefore I do not wish to be limited to all the details of construction herein shown and described, but What I do claim is:—

1. The combination with a driving pulley on a horizontal axis, a driven pulley on a vertical axis, two connected pulleys, a substantially vertical belt extending from the pulley on the horizontal axis to one of the connected pulleys, and a substantially horizontal belt extending from the other of the connected pulleys to the pulley on the vertical axis, of a pivoted arm making an acute angle with both belts having bearings for supporting said connected pulleys, and mounted so as to be free to swing on its pivot, a hand lever, and means connected with said hand lever and independent of said arm for changing the tensions of both of said belts.

2. In a drill, the combination of a frame having a goose neck, an arm pivoted on the rear thereof and extending upwardly and outwardly from its pivot, a shaft supported by the outer end of said arm, two sets of pulleys carried by said shaft, a driving cone pulley near the bottom of the goose-neck, a driven pulley near the top thereof, belts connecting said driving and driven pulleys with the two pulleys on said shaft, said arm being free to swing on its pivot, a hand-lever mounted on said frame, and means connected with said hand-lever for tightening the belts, said means comprising a roller having a length equal to that of the cone pulley and engaging one of the belts.

3. In a drill, the combination of a frame having a goose-neck, an arm pivoted on the rear thereof and extending upwardly and outwardly from its pivot, a shaft supported by the outer end of said arm, two pulleys carried by said shaft, a driving pulley near the bottom of the goose-neck, a driven pulley near the top thereof, belts connecting said driving and driven pulleys with the two pulleys on said shaft, said arm being free to swing on its pivot, a hand lever mounted on said frame, means connected with said hand lever for tightening the belts, a foot treadle near the bottom of the frame, and a belt shifter for the belt on the driving pulley connected with said foot treadle.

In testimony whereof I have hereunto set my hand, in the presence of two subscribing witnesses.

ALBERT E. NEWTON.

Witnesses:
　LOUIS W. SOUTHGATE,
　C. FORREST WESSON.

---

Copies of this patent may be obtained for five cents each, by addressing the "Commissioner of Patents, Washington, D. C."